June 28, 1932.  G. LOWKRANTZ ET AL  1,864,657
COMBINED SHUTTER AND FILM MOVING MECHANISM
Filed Feb. 1, 1929
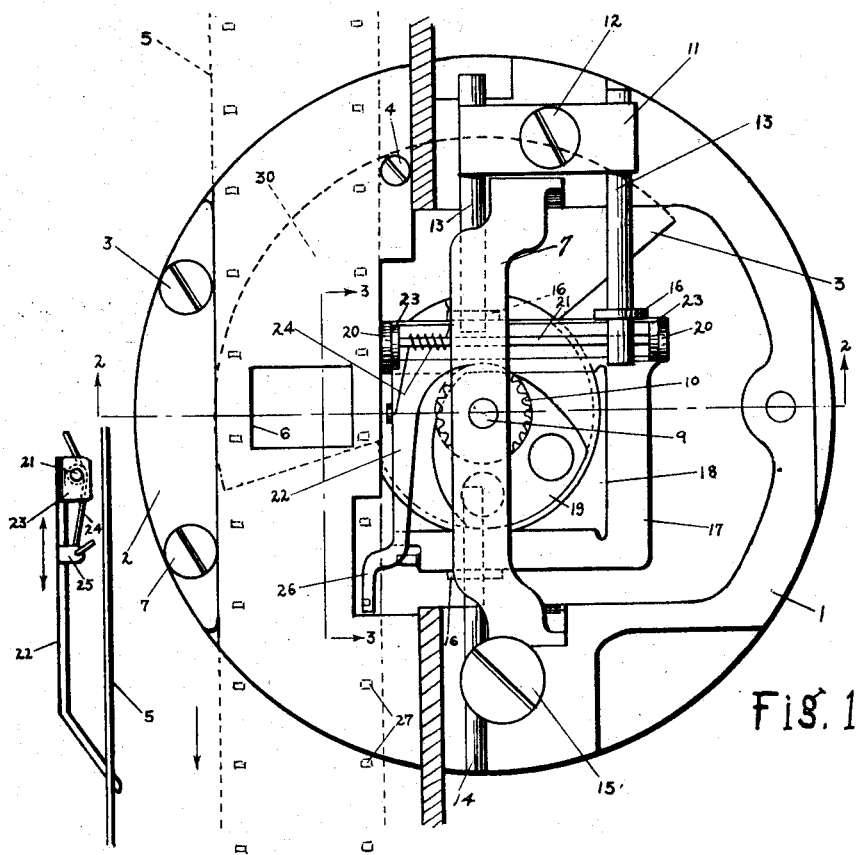
Fig. 1.
Fig. 3.
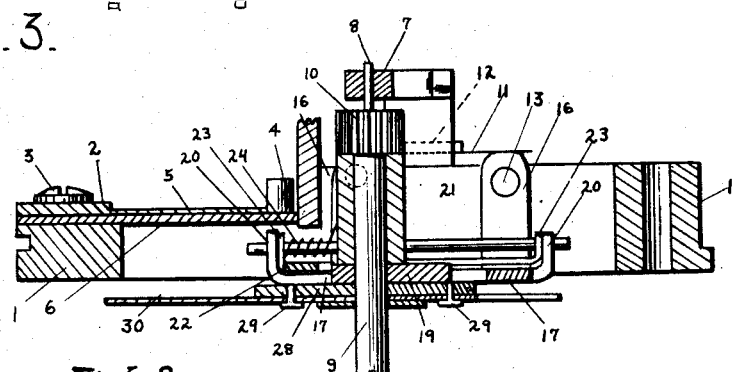
Fig. 2.
INVENTOR.
GUNNE LOWKRANTZ
LEW W. LESSLER
BY
ATTORNEY.

Patented June 28, 1932

1,864,657

UNITED STATES PATENT OFFICE

GUNNE LOWKRANTZ, OF BINGHAMTON, AND LEW W. LESSLER, OF JOHNSON CITY, NEW YORK, ASSIGNORS TO AGFA ANSCO CORPORATION, OF BINGHAMTON, NEW YORK, A CORPORATION OF NEW YORK

COMBINED SHUTTER AND FILM MOVING MECHANISM

Application filed February 1, 1929. Serial No. 336,829.

Our invention relates to improvements in a combined shutter and film moving mechanism and has for its primary object the provision of a simple balanced shutter and film shuttle which will operate perfectly at high speed and with smoothness and accuracy.

As is well known in the art of motion pictures, the film moving mechanism and the shutter must be so timed that there is perfect cooperation in order that during the intermittent movement of the film the shutter will cover the exposure aperture when the film is moving and uncover it during the time the film is stationary. Inasmuch as the mechanism for this purpose is run usually at high speed, it is essential that the moving parts be arranged to permit the maximum smoothness and accuracy of operation.

We have, therefore, provided a combined shutter and film moving mechanism which is so balanced that the swift rotary movement thereof is true and uninterrupted and with a smoothness that insures the greatest accuracy.

Other objects and advantages in details of construction and arrangement of parts will be apparent as the description now proceeds, reference being had to the figures of the drawing forming a part of this application and wherein like reference numerals indicate like parts.

In the drawing:—

Figure 1 is a detail rear view of our improved shutter and film moving mechanism.

Figure 2 is a detail cross sectional view taken on the line 2—2 of Figure 1.

Figure 3 is a detail side view showing the film claw and taken on the line 3—3 of Figure 1.

In carrying out our invention, we provide a casing or housing 1, preferably a casting, provided with any suitable means for mounting the same in position on a camera for operation. This housing 1 is provided adjacent one side with a film guide comprising on one side the plate 2 securely held in position by the screws 3 and on the other side by the screws 4. The film 5 is adapted to be moved between these parts, being guided along one edge by the plate 2 and along the inner edge by the screws 4. The casing 1 is provided with an exposure aperture 6 lying directly beneath the film and in the path of its travel between the guides.

The casing 1 is provided centrally with a strap or bearing member 7 and journaled centrally in this strap 7 is the reduced end 8 of a shaft 9 extending centrally through the casing 1. Secured adjacent one end of this shaft 9 is a pinion 10 by means of which the shaft may be rotated through any suitable driving mechanism from the camera, such as for instance a spring motor or hand crank.

Suitably mounted adjacent one edge of the housing 1 as by the clamp bearing 11 and screw 12 are two horizontally disposed guide rods 13 extending inwardly from the edge of the housing. Likewise, suitably mounted upon the opposite edge of the housing 1 and in alignment with one of the guide rods 13 is another guide rod 14 rigidly held in position by means of the screw 15. Slidably mounted upon these guide rods 13 and 14, by means of upturned ears or flanges 16, is a shuttle frame 17, the inner edges of the three sides of which provide a rectangular opening 18 engageable by a cam 19 whereby upon rotation of the cam, the shuttle frame is slid back and forth on the rods 13 and 14. The cam 19 is suitably secured upon the shaft 9 for rotation therewith.

The shuttle frame 17 is provided on opposite sides adjacent one edge with upstanding ears 20 journaled in which is a pintle 21. Pivotally mounted upon this pintle is one end of a film claw 22 provided at its pivotal end with laterally turned ears 23 providing pivot means for the claw on the pintle 21. Encircling the pintle 21 between the ears 23 is a coil spring 24 having one end secured to a downwardly turned ear 25 on the claw and the opposite end anchored against the shuttle frame 17, whereby the claw 22 is normally urged by the spring into engagement with the adjacent edge of the film 5. The free end of the claw 22, as its clear from Figure 1, is offset as at 26, so as to be positioned in alignment with the inner row of perforations 27 of the film 5. Obviously, therefore, as the shuttle frame 17 is reciprocated upon the rods 13 and 14 by means of the cam 19, the claw 22 will upon the downward movement of the shuttle in Figure 1 engage in a perforation 27 and move the film therewith. Upon the upward movement of the shuttle frame, the claw will ride out of the perforations and over the edge of the film, due to the resiliency of the spring 24, to a position ready to again move the film downwardly upon the return movement of the shuttle frame.

Also mounted upon the shaft 9 is a weighted disk or fly wheel 28 secured to which, as by the rivets 29, is the shutter leaf 30. This shutter leaf 30 is, as shown clearly in Figure 1, extended outwardly from the center a distance sufficient to overly the exposure aperture 6. This extended portion of the shutter leaf is somewhat less than 180° in order that a maximum amount of exposure period may be had upon each revolution of the shutter. In other words, in order that the exposure aperture 6 may be uncovered during the entire time that the cam 19 is moving out of engagement with the lower side of the shuttle frame. Obviously, therefore, the exposure aperture 6 is uncovered by the shutter leaf except during the engagement of the cam 19 with the lower side of the shuttle frame 17, during which time film 5 is moved downwardly by the claw.

In order that the outwardly extending portion of the shutter leaf 30 may be properly balanced with respect to the other rotating parts, and thus caused to rotate, smoothly and accurately, it will be noted that the cam 19 has been so positioned as to extend outwardly from the shaft 9 in the opposite direction from the shutter leaf 30. It will be observed also that although the cam 19 does not extend so far outwardly as does the shutter leaf 30 from the shaft 9, said cam is considerably heavier as shown in Figure 2 than the shutter leaf, and therefore, serves to offset and balance the same.

Therefore, regardless of the high speed at which the parts may be operated, the rotating members are always maintained in perfect balanced relation, thus insuring a smooth and accurate operation of the parts.

Of course, many changes may be made by way of detail without departing from the spirit and scope of our invention. We do not limit outselves, therefore, to the exact form herein shown and described other than by the appended claim.

We claim:—

In combination, a rotatable shaft, film moving mechanism, a cam rotatable with said shaft for operating said mechanism, and a shutter leaf rotatable with said shaft, said cam and said shutter leaf being offset from said shaft in opposite directions whereby to balance each other in the rotation thereof.

In testimony whereof, we affix our signatures.

GUNNE LOWKRANTZ.
LEW W. LESSLER.